March 22, 1955

T. B. TYLER 2,704,666

ROTARY AMUSEMENT RIDE

Filed Jan. 24, 1948

INVENTOR.
TRACY B. TYLER,
BY
ATTORNEY

March 22, 1955 T. B. TYLER 2,704,666
ROTARY AMUSEMENT RIDE
Filed Jan. 24, 1948 10 Sheets-Sheet 2

INVENTOR.
TRACY B. TYLER,
BY
ATTORNEY

INVENTOR.
TRACY B. TYLER,
BY
ATTORNEY

March 22, 1955 T. B. TYLER 2,704,666
ROTARY AMUSEMENT RIDE
Filed Jan. 24, 1948 10 Sheets-Sheet 4
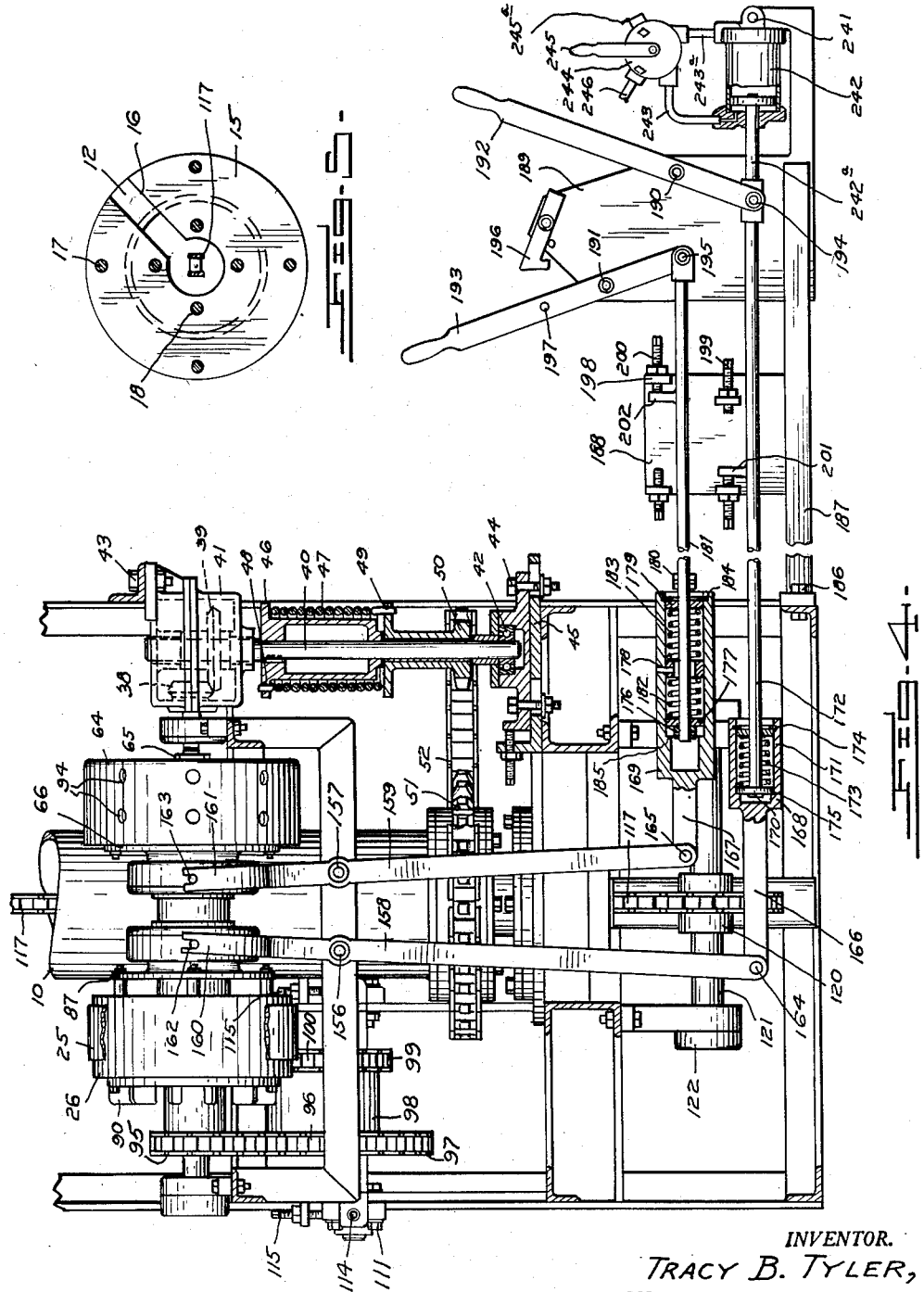
INVENTOR.
TRACY B. TYLER,
BY
ATTORNEY

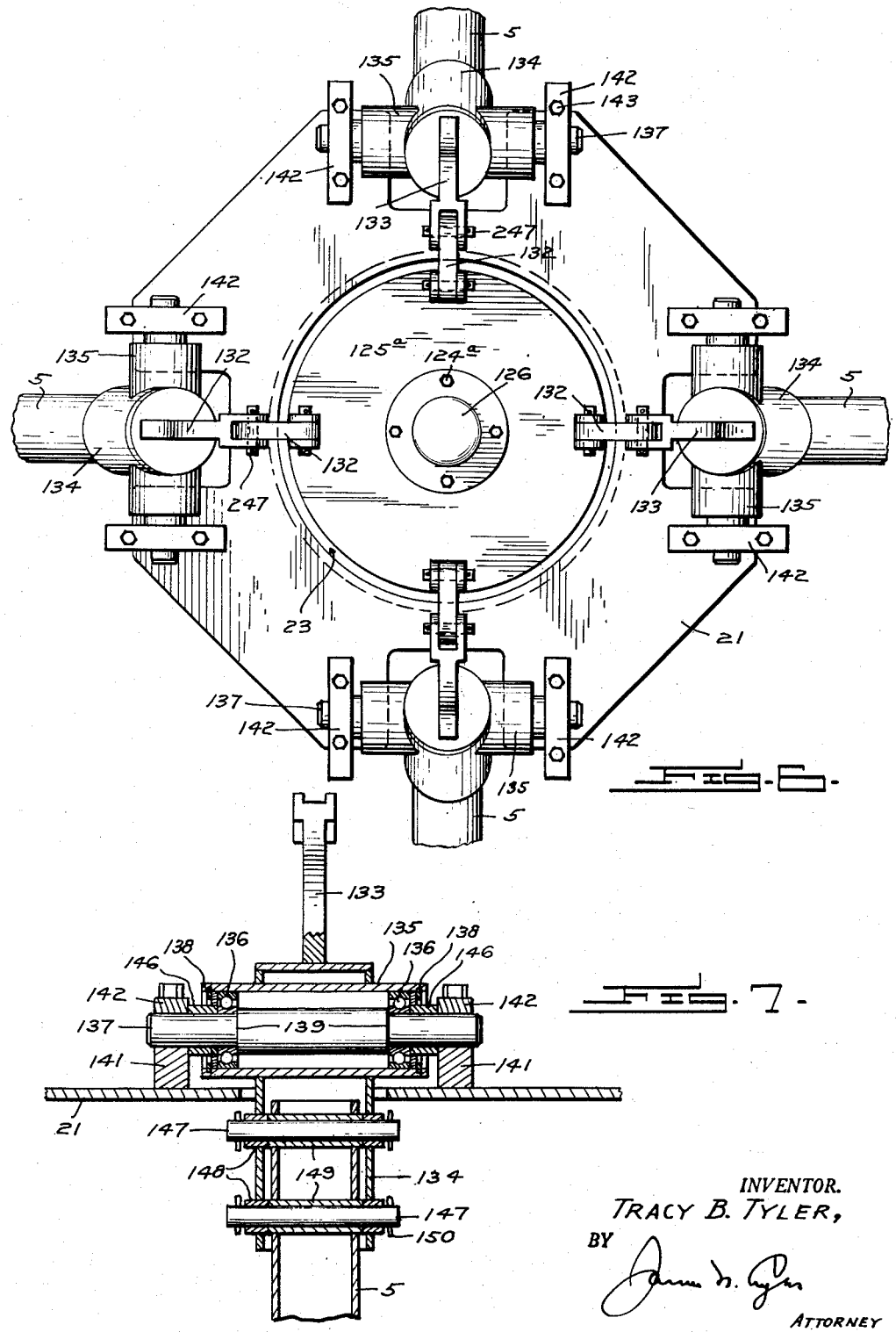

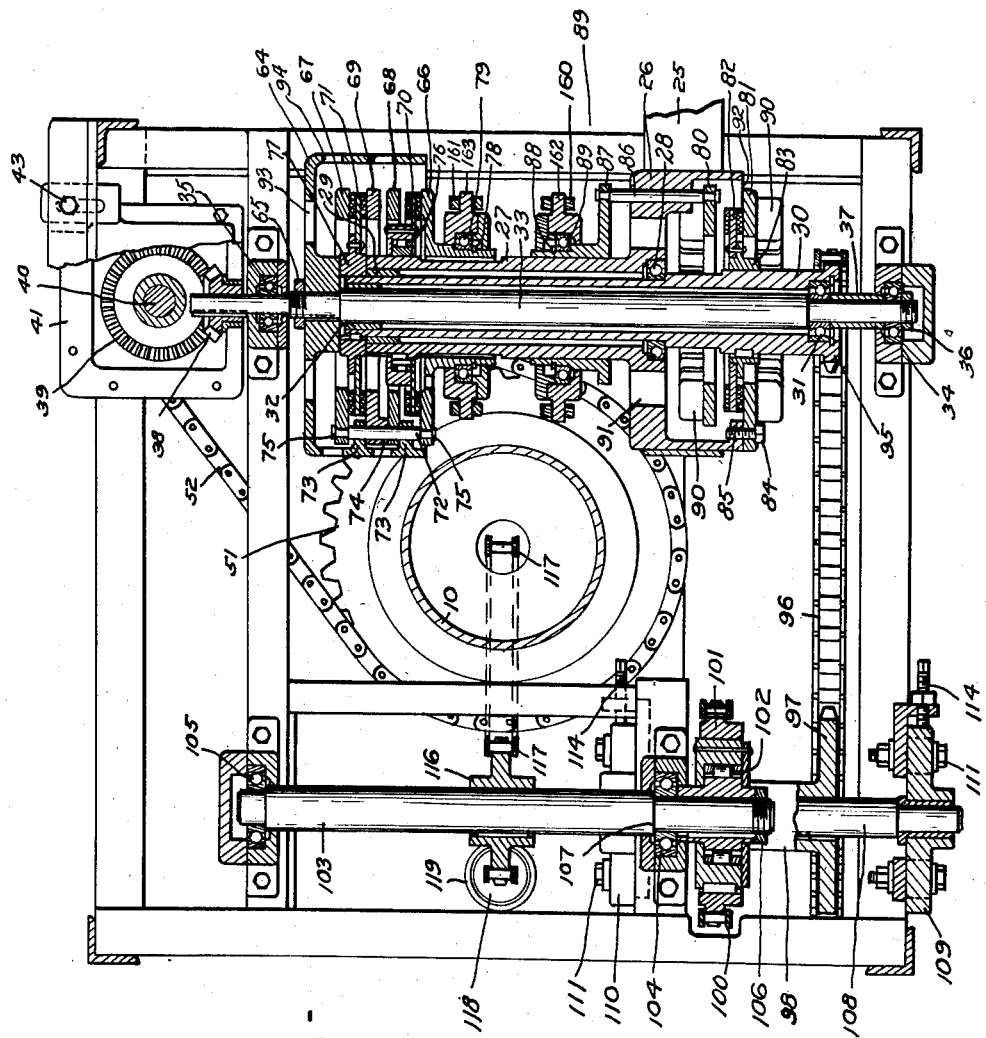

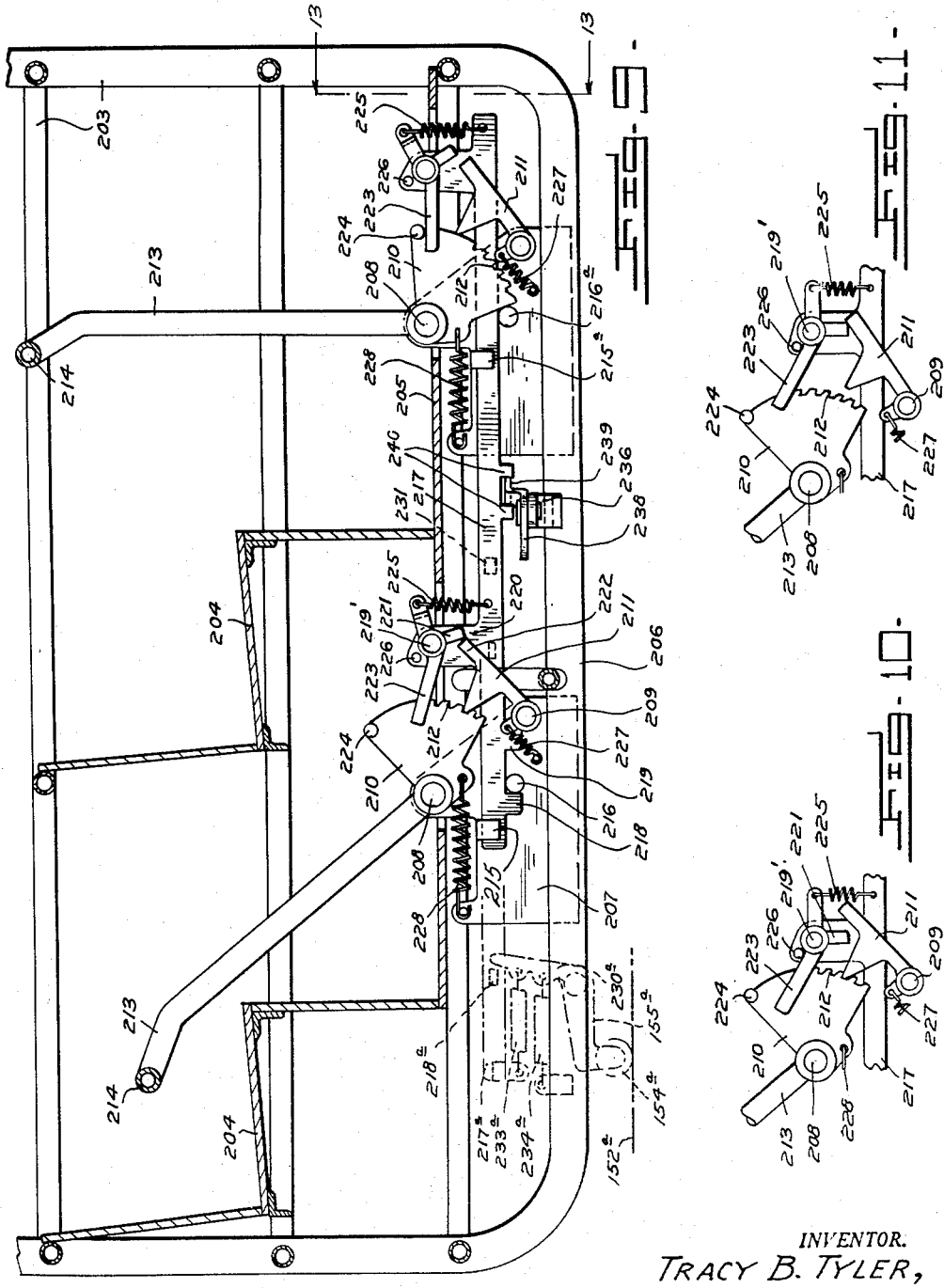

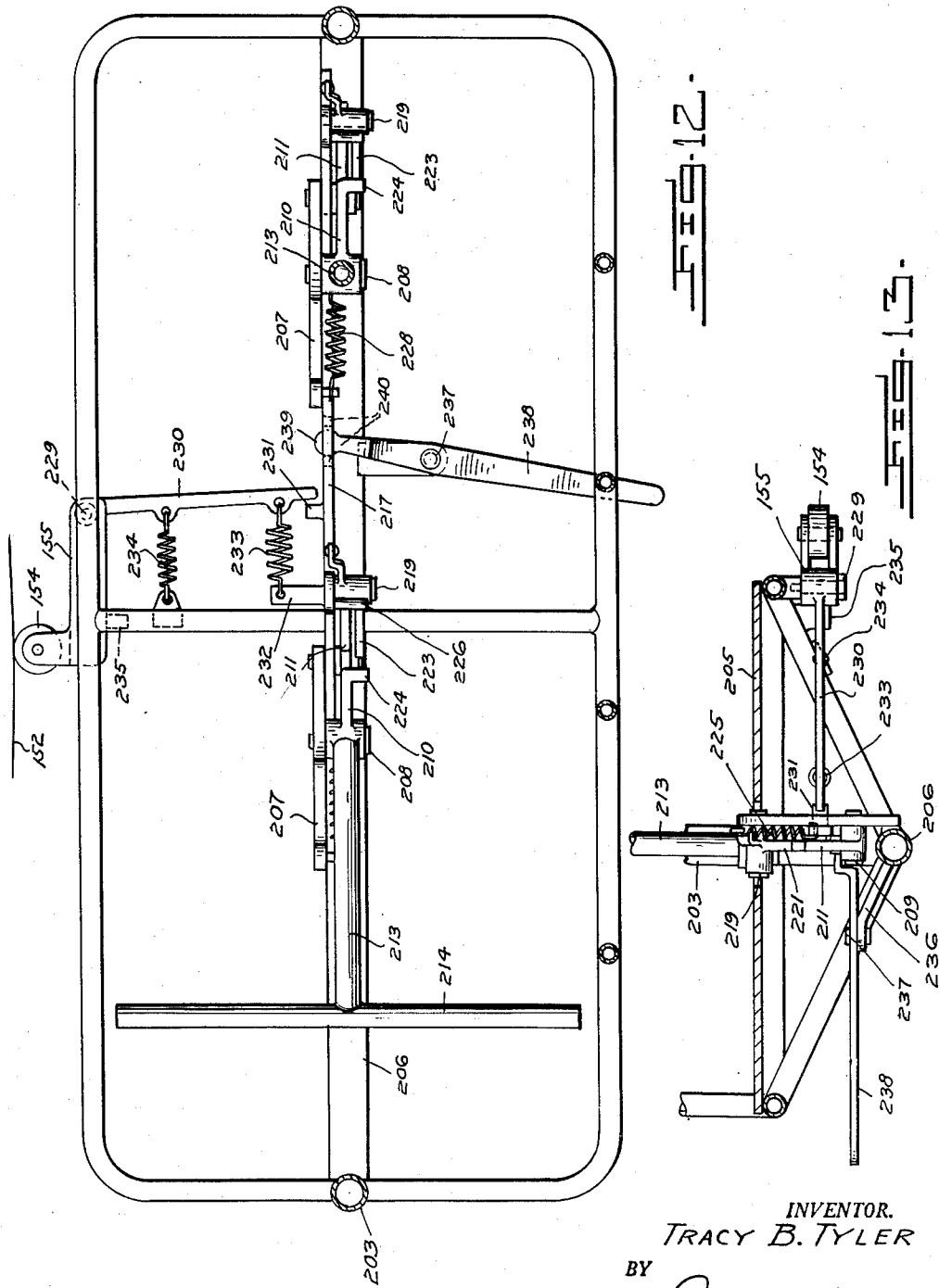

March 22, 1955     T. B. TYLER     2,704,666
ROTARY AMUSEMENT RIDE
Filed Jan. 24, 1948     10 Sheets-Sheet 9
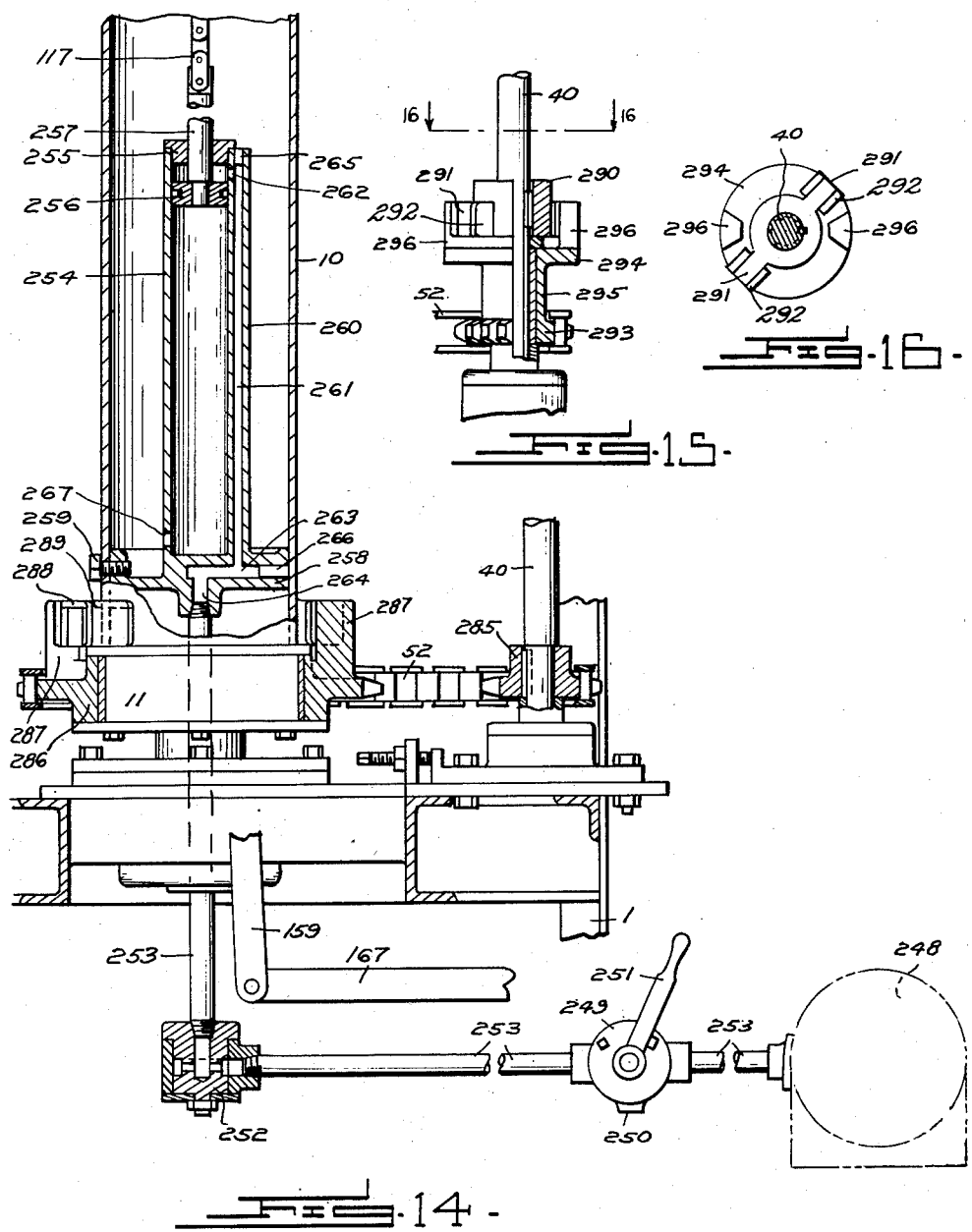
INVENTOR.
TRACY B. TYLER,
BY
ATTORNEY March 22, 1955 T. B. TYLER 2,704,666
ROTARY AMUSEMENT RIDE
Filed Jan. 24, 1948 10 Sheets-Sheet 10

INVENTOR.
TRACY B. TYLER,
BY
ATTORNEY

United States Patent Office 2,704,666
Patented Mar. 22, 1955

2,704,666

ROTARY AMUSEMENT RIDE

Tracy B. Tyler, Miami Beach, Fla.

Application January 24, 1948, Serial No. 4,179

23 Claims. (Cl. 272—36)

This invention relates to amusement rides and improvements in the structure and operating elements thereof.

More particularly the invention relates to such improvements in amusement rides of that character which comprise sweeps or arms affixed at one end to rider vehicles and at the other end to mechanism or apparatus which is adapted to cause said vehicles to perform various and sundry gyrations.

A general object of the invention is the provision of a ride in which rider vehicles are caused to oscillate in unison in a vertical plane while being whirled through a horizontal plane.

Another object is to provide structural elements and mechanisms so simplified in design as to require minimum knowledge, time and effort for maintenance, service and repair work.

A further object is to provide improved arrangements and cooperating combinations of structural elements and mechanisms whereby advantageous compactness is attained and weight substantially reduced.

A still further object is to provide driving and operating elements and mechanisms whereby the ride may be operated both simply and safely.

Still another object is to provide structural elements and mechanisms which may be easily and quickly assembled and disassembled whereby the ride may from time to time be readily dismantled and conditioned for transportation to other sites upon which it is to be erected and operated.

These and various other objects and advantages of my invention will be apparent from the following description wherein reference is made to the accompanying drawings illustrating preferred and modified embodiments of my invention, and wherein similar numerals designate similar parts throughout the several views.

In the drawings:

Figure 4 is a view partly in side elevation and partly in sections, illustrating driving and operating elements embodied in the invention, as viewed from the right hand side of Figure 1.

Figure 5 is a horizontal section taken on line 5—5 of Figure 3 and illustrating a coupling plate embodied in the rotor column.

Figure 6 is a top plan view of the rotor head and associated elements.

Figure 7 is a fragmentary vertical section through the sweep mounting coupling, taken on line 7—7 of Figure 3.

Figure 8 is a view partly in plan and partly in horizontal section, illustrating driving and clutching elements embodied in the invention, taken on line 8—8 of Figure 2, with parts broken away to illustrate a lower shaft mounting.

Figure 9 is a central vertical longitudinal section of one of the rider vehicles and illustrating the rider securing means and mechanism in side elevation.

Figure 10 is a fragmentary side elevation of one of the latch assemblies of Figure 9 in one operative position.

Figure 11 is a similar view showing the mechanism in another position.

Figure 12 is a plan view of the rider vehicle and its rider securing mechanism, parts being omitted for the sake of clarity.

Figure 13 is a transverse vertical section through the rider vehicle taken on line 13—13 of Figure 9, parts being omitted and broken away for the sake of clarity.

Figure 14 is a fragmentary vertical section, illustrating a modified form of rotor driven coupling and oscillating means for the sweeps.

Figure 15 is a view partly in vertical section and partly in side elevation of a modified form of driving element for the rotor.

Figure 16 is a view taken on line 16—16 of Figure 15.

Figure 1:
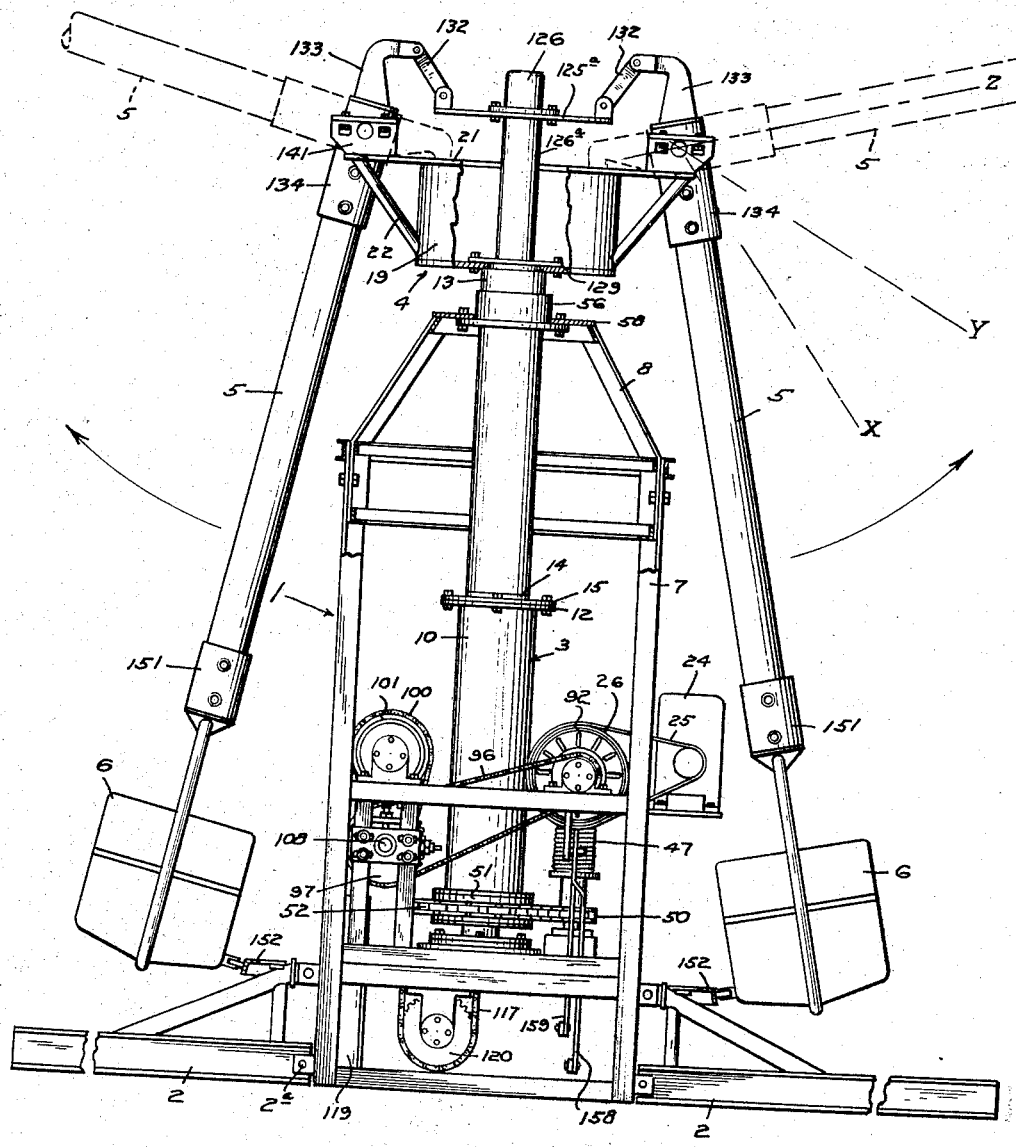
Figure 1 is a side elevation of a structure embodying a preferred form of the invention, parts being omitted and broken away for purposes of clearness.

Referring specifically to the drawings and as best shown in Figure 1, the ride in general may comprise a suitable structural supporting frame or tower, assembled as by welding or bolting, generally designated 1, laterally extended stabilizing foot-sills 2, which may be affixed to the frame as by pins 2a, a vertical rotor column, generally designated 3, a rotor head, generally designated 4, a plurality of arms or sweeps 5, swingably affixed at their upper ends to the rotor head 4 and rigidly affixed at their lower ends to rider cars or vehicles, generally designated 6, the operable elements adapted to be driven and controlled by means presently to be described.

The frame or tower comprises a main structure 7 and a crown structure 8, which latter is affixed to the former as by bolts 9.

The rotor column comprises a hollow cylindrical lower member 10, which has affixed to its lower extremity, as by welding, a base member 11, and to its upper extremity, as by welding, a radially extended flange 12; a hollow cylindrical upper member 13, which has affixed, as by welding, to its lower extremity a radially subtended flange 14, and to its upper extremity, as by welding, the base of rotor head 4; and a coupling plate 15, which is provided at one side with a through slot 16 (Figure 5), and which plate is affixed, as by bolts 17 and 18, to the flanges 12 and 14 respectively.

The rotor head comprises a vertical cylindrical body 19, which at its lower extremity is affixed, as by welding, to a base plate 20, and at its upper extremity, as by welding, to a radially extended flange or plate 21, which latter may be suitably braced as by struts 22.

It is to be observed that by its construction the rotor head forms a unit with a relatively large open well 23 in its center. This is required for reasons which will hereinafter be described.

Referring now to the driving and controlling elements, 24 designates a power unit, diagrammatically illustrated, which may be a gasoline engine, an electric motor, or other suitable power apparatus, and which may be suitably mounted on a member of the frame 1, as shown. By a belt, such as 25, or by other means, the power unit is adapted to transmit rotation to main pulley 26, which latter is associated with driving and clutching elements now to be described. Referring to Figure 8, it will be seen that the pulley 26 is provided with an axially extended annular sleeve 27, and as a whole is journaled, as by ball bearing 28 and bushing 29, for normally free rotation on another annular sleeve 30, which latter, in turn, is journaled, as by ball bearing 31 and bushing 32, for normally free rotation on a shaft 33, which latter, again in turn, is suitably rotatably supported and journaled in housed bearings, as 34 and 35, these being affixed to members of the frame 1 in conventional manner. One end of the shaft 33 is axially affixed to the bearing 34 by means of a nut 36 and an abutting annular sleeve 37.

Carried by and keyed to the opposite end of shaft 33 is a gear 38 which is in mesh with a gear 39, the latter being affixed to a vertical shaft 40 (best seen in Figures 4 and 8), which is rotatably supported and journaled at its upper portion in a housing 41, and at its lower end in a housed bearing 42. The housing 41 is adjustably affixed, as by bolts 43, to another member of the frame 1, while the housing of bearing 42 is adjustably affixed, as by bolts 44, to a plate member 45 of the frame 1. Carried by and keyed to shaft 40 is an annular spring supporting drum 46. Encompassing this drum is a coiled torsion spring 47 one end of which is affixed as at 48 to a flanged portion of the drum and the opposite end of which is affixed as at 49 to a flanged portion of a hub extension of a chain sprocket 50, the latter being suitably journaled on shaft 40 for limited rotation thereon responsive to varying driving tensions of the torsion spring.

A chain sprocket 51 (Figures 2, 4 and 8), carried by and keyed the base member 11 of the rotor column 3, is adapted to be driven by the sprocket 50 as by means of a chain 52. The rotor column, at its lower extremity, is preferably supported both axially and radially and journaled for rotation in housed ball bearings 53 and 54. The bearing housing, in turn, may be supported by and affixed, as by bolting, to another plate member 55 of the frame 1.

The upper portion of the rotor column is rotatably supported radially and journaled for rotation in a collar bushing 56, which latter is affixed, preferably by bolts 57, to a plate member 58 of the frame crown 8. It is to be noted here that the bolts 57 are mathematically calculated as to size and number so that their total shear value is such that should the bearing become seized to the rotor during operation the bolts will shear without transmitting torsional overstress to the frame and without appreciably slowing the rotor R. P. M. This provision is of considerable importance for reasons which will hereinafter be more fully described. Should such seizure and shearing occur the collar bushing 56 is adapted to safely run for some little while on the surfaces 59 which form the pilot. For purposes of economy it is also preferable to make this collar bushing and its bolt flange as an integral casting rather than as a holder with a separate liner bushing therein.

To avoid the necessity for precision construction it is preferable that the rotor be self-aligning in relation to its lower bearing and the frame structure. To provide such a self-aligning condition the rotor is first supported by and carried on a spherical nosed pilot member 60, which latter cooperates with and is seated in a corresponding spherical receptacle 61. For economy in machining, the receptacle is formed as a separate element, which is adapted to be inserted in a counterbore of rotor base member 11. A plate 62, affixed as by bolting to member 11, axially retains the sprocket 51 and underlaps a shoulder of the pilot member 60 to retain the rotor on its spherical seat. The pilot member 60 is axially retained in the bearings 53 and 54 as by means of a snap-ring 63.

Referring again now to Figure 8, carried by and keyed to the shaft 33, is a clutch and brake carrier 64, which is retained axially against a shoulder of the shaft by means of a nut 65. Associated with the carrier is a disc clutch pressure plate 66; a disc brake pressure plate 67; backing plates 68 and 69; a clutch friction disc 70, and brake friction disc 71. The backing plates are carried, supported and driven by a plurality of axially slidable pins 72, which in turn are carried and supported by inwardly extended lugs 73 of the carrier 64. The backing plates are also disposed between the lugs 73 and abut one another by means of bosses 74 on plate 69. Thus, the backing plates are restrained from axial movement under thrust by such abutment with each other and closely fitted abutment with lugs 73. Pressure plates 66 and 67 are affixed to shouldered ends of the pins 72 as by means of snap-rings 75, thereby adapting the pins to transmit axial thrust in either direction upon movement of the pressure plates.

Clutch and brake friction discs 70 and 71 are provided with suitable frictional facings (undesignated) in the conventional manner. Disc 70 is affixed, as by riveting, to an overrunning clutch, generally designated 76, which in turn is carried by and suitably keyed to the sleeve 27, but axially free thereon. In this disclosure the overrunning clutch is indicated as a pinch-roller clutch of conventional and common form, but a ratchet or other form of overrunning drive means may be substituted without departing from the scope of my invention.

Brake friction disc 71 is affixed, as by riveting, to a hub 77 which in turn is carried by and suitably keyed to the sleeve 30, but axially free thereon.

Journaled on an axially extended annular shouldered hub of the pressure plate 66, and axially retained thereon as by a snap-ring 78, is a housed clutch actuating ball bearing 79.

The pulley 26 also constitutes a clutch carrier, and associated therewith is a clutch pressure plate 80; a backing plate 81; and a clutch friction disc 82. The latter is affixed, as by riveting, to a hub 83 which in turn is carried by and suitably keyed to sleeve 30, but axially free thereon. Backing plate 81 is affixed to pulley 26 as by means of a plurality of bolts 84 disposed in inwardly extended lugs 85 on the pulley rim. Pressure plate 80 is affixed to and supported and driven by a plurality of axially slidable pins 86 which in turn are carried by and extend through fitted apertures in thickened portions of pulley 26. Pins 86 are similar in all respect to pins 72 and have affixed to their ends opposite from the pressure plate 80 another plate 87.

Journaled on an axially extended annular shouldered hub of the plate 87, and axially retained thereon as by a snap-ring 88, is a housed clutch actuating ball bearing 89.

Clutch plates 80 and 81 are provided with a plurality of axially extended and circumferentially spaced air cooling fins 90. Air for cooling the pressure plate 80 is admitted through apertures 91 in the web wall of pulley 26, being induced to flow therethrough by effect of centrifugal ejection from an aperture 92, the latter being formed by the space between the rim of the pulley 26 and the outer periphery of the plate 81.

Provision is also made for the normally required air cooling of the clutch and brake members of carrier 64. In this, air is admitted through apertures 93 in the web wall of the housing and centrifugally ejected through apertures 94 in the rim thereof.

Figure 2:
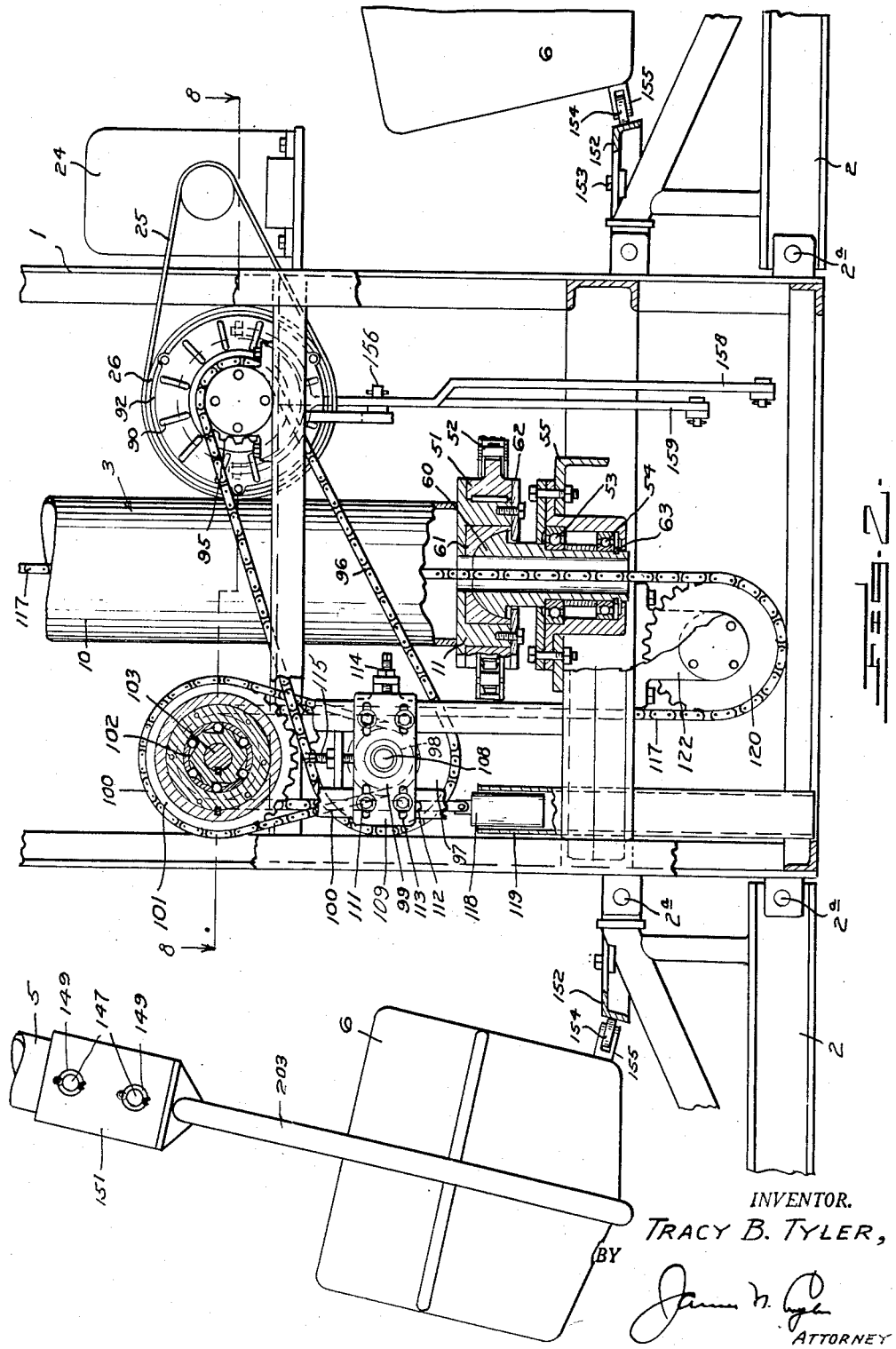
Figure 2 is a view partly in side elevation and partly in section, on an enlarged scale, of the lower portion of the structure illustrated in Figure 1.

A chain sprocket 95 is formed integral with or is otherwise affixed to the exposed end of sleeve 30. Drivable thereby, as by means of a chain 96, is a second sprocket 97 to which latter is affixed, as by a common hub 98, a third sprocket 99 (Figures 2 and 4). Drivable by sprocket 99, as by means of a chain 100, is a fourth sprocket 101 which is suitably affixed, as by keying and press fitting, to an overrunning clutch, generally designated 102. Again in this disclosure the latter is indicated as a pinch-roller clutch of conventional and common form, but a ratchet or other form of overrunning drive means may be substituted without departing from the scope of my invention.

The overrunning clutch 102 is carried by and suitably keyed to a shaft 103, the latter being rotatably journaled and supported in housed bearings, as 104 and 105, which latter in turn are affixed to members of the frame 1 in a conventional manner. Shaft 103 and overrunning clutch 102 are axially affixed to the bearing 104 as by means of a nut 106 and an abutting shoulder 107 of the shaft.

Sprockets 97 and 99 are carried by and suitably affixed to a shaft 108 which is rotatably journaled at either end in plates or brackets 109 and 110. The latter are adjustably affixed to vertical members of the frame 1 as by bolts 111. To compensate for wear of and to maintain proper tension in the chains 96 and 100, plates 109 and 110 are adapted for adjustment in two directions by means of elongated vertical bolt slots 112 (Figure 2) in the frame members and elongated horizontal bolt slots 113 in the plates. Adjustment is accomplished and maintained by means of jack screws 114 and 115.

Carried by and suitably affixed to shaft 103 is a sprocket 116 to which is meshed a chain 117. The latter, at one end, is maintained in mesh with the sprocket 116 by means of a gravity counterweight 118 which is adapted to reciprocate in a casing 119 which guides and houses it. From sprocket 116 the chain 117 is led to an idler sprocket 120 which latter is carried by a rotatable shaft 121 (Figure 4) which at either end is suitably journaled in housed bearings 122 which in turn are affixed to members of the frame 1 in conventional manner. From sprocket 120 the chain is led upward through a bore of pilot member 60 and the hollow interior of rotor column 3 whence it terminates with affixment to the lower end of a rotatable spindle 123 which latter is journaled preferably in ball bearings 124 and 125 which are suitably retained in a rigid housing 126. Bearing 125 is of radial-thrust type, and spindle 123 is shouldered to rest thereon to sustain chain pull while rotating. The housing 126 may be affixed, as by bolts 124a, to a plate 125a which in turn is affixed, as by welding, to a cylindrical plunger 126a, which latter is carried by bearing bushings 127 in which it is adapted to reciprocate axially.

The bushings 127 are retained, as by press fitting, in a cylindrical sleeve 128 which latter is adapted to be inserted in the hollow rotor column member 13. The upper end of sleeve 128 is provided with a radially extended flange 129 by which it may be affixed to the rotor head 4 as by bolts 130. For piloting and centralizing of the upper portion of sleeve 128 it is only necessary to machine the contacting portions of the rotor head and sleeve, designated 130a. For piloting or supporting the lower end of sleeve 128 a plurality of studs 131 are preferably provided, these being inserted through apertures in the rotor column and welded thereto while in contact with sleeve 128.

Provision of the insertable sleeve 128 eliminates necessity for long depth machining of inside of the rotor column, thereby contributing to economy.

Figure 3:
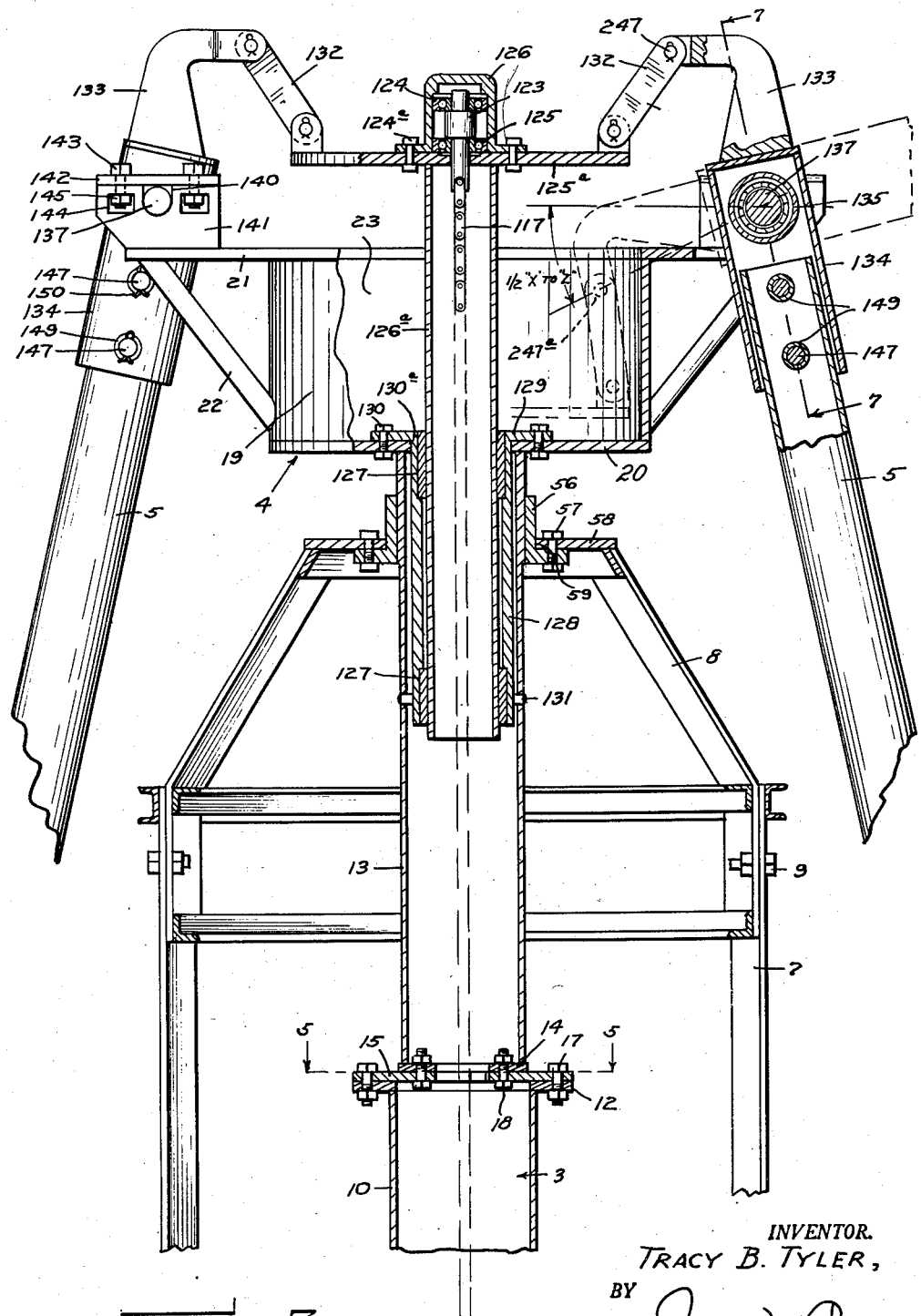
Figure 3 is a view partly in side elevation and partly in section, on an enlarged scale, of the upper portion of the structure illustrated in Figure 1.

Flexibly connected to the plate 125a as by links 132 are rocker arms 133 which are affixed, as by welding, to holders 134 for the sweeps 5. The sweep holders 134 are provided with a tubular cross member 135 (best seen in Figure 7) which serves as a retainer and housing for bearings 136 which swingably journal the holder on a stationary shaft 137. The bearings 136 are axially retained on the member 135 as by snap-rings 138. The shaft 137 is axially retained between the bearings 136 by shoulders 139 and at each end is cradled and supported in U slots 140 (Figure 3) provided in blocks 141 which latter are affixed, as by welding, to the plate 21 of the rotor head. Suitable caps 142, affixed as by bolts 143 to the blocks 141, retain the axle 137 in the U slots of the blocks. To preclude necessity for threading the bolt holes of blocks 141 apertures 144 are provided therein which are adapted to receive nuts 145 to retain the bolts.

The sweep holder assembly is axially retained and positioned between the blocks 141 by means of collars 146 (Figure 7), one end of which abut blocks 141, the other, the bearings 136.

The sweeps 5 are preferably inserted in the holders 134 and rigidly coupled thereto by means of a pair of removable transverse pins 147. In the holders 134, bearing surface for the pins 147 is increased by means of tubular inserts 148 affixed in the wall of the holder, as by welding. In the sweeps, bearing surface for the pins 147 is increased by means of one piece transverse tubular inserts 149 affixed at either end to the wall of the sweep, as by welding. The one piece inserts also serve as guides to facilitate insertion of the pins. Pins 147 may be axially retained by any suitable means, as for example cotter pins 150. It will be apparent however that the assembly of the sweep with respect to the sweep holder may be reversed, with the sweep engaging over the holder and retained in the manner just described.

Sweep holders 151 of the cars 6 are coupled to the sweeps in the same manner and by the same means as described for the axle end holder.

Swinging of the cars inwardly towards the rotor when the latter is decelerated and stopped is limited and arrested by means of a circular crowd-rail 152, which may be affixed to footsills 2 as by bolts 153, and which is adapted to cooperate with a roller 154 mounted in an arm 155 which is yieldably affixed to the car. The arm also functions for other purposes which will hereinafter be described.

Referring now to the clutch actuating and ride operating elements: pivotally affixed as at 156 and 157 (Figure 4) to a member of the frame 1 are two actuating levers 158 and 159 which at their upper ends terminate in two-pronged forks 160 and 161 of conventional form. The ends of the latter may be provided with U slots adapted to engage trunnion elements 162 and 163 radially extended from either side of the housings of actuating bearings 89 and 79 respectively.

Pivotally connected, as at 164 and 165, to levers 158 and 159 are rods 166 and 167 which are affixed at their opposite ends, as by welding, to cylinders 168 and 169 respectively.

Associated with cylinder 168 are collars 170 and 171; another rod 172; a compression spring 173, and a retaining ring 174. Collar 170 is axially slidable in the cylinder chamber and is affixed, as by riveting, to the end of rod 172 which latter is further supported by and axially slidable in the bore of collar 171. One end of spring 173 abuts collar 171 which is retained by snapping 174. The opposite end of the spring abuts collar 170 and thereby urges the latter, and hence rod 172, to the left, as viewed in the drawing, Figure 4, until collar 170, when free of operational bias to the opposite direction, is stopped by abutment with a shoulder or step 175 formed in the cylinder chamber. A predetermined preload bias remains in the spring when the collar 170 is stopped as shown.

Associated with cylinder 169 are collars 176, 177, 178, 179 and 180; another rod 181; compression springs 182 and 183, and a retaining snap-ring 184. Collars 176 and 180 are affixed, as by pinning, to rod 181. Collar 178 is affixed, as by pinning, to cylinder 169. Collars 177 and 179 are axially slidable in the cylinder chamber. The rod 181 is supported by and axially slidable in the bores of collars 177 and 179. One end of springs 182 and 183 abut collar 178. The opposite end of spring 182 abuts collar 177 which latter in turn abuts collar 176 and thereby urges the latter two members, and hence rod 181, to the left, as viewed in the drawing, Fig. 4, until collar 177, when free of operational bias to the opposite direction, is stopped by abutment with a shoulder or step 185 formed in the cylinder chamber. Similarly, the opposite end of spring 183 abuts collar 179 which latter in turn, under conditions about to be described, abuts collar 180 and thereby urges the latter, and hence rod 181, to the right, as viewed in the drawing, Fig. 4, until collar 179, when free of operational bias to the opposite direction, is stopped as shown and retained by snap-ring 184.

As shown in the drawing, collar 177 is under operational bias to the right and away from stop shoulder 185. In this condition collar 180 has been moved a corresponding distance away from collar 179. When free of operational bias to either direction the condition is designated as "neutral," and in such condition collar 177 is in abutment with stop shoulder, collar 179 in abutment with snap-ring, and collars 176 and 180 are slightly clear of collars 177 and 179 and thereby free of spring bias in either direction. Thus, when rod 181 is moved in the direction shown on the drawing, the bias of spring 182 alone is transmitted as "pull" to lever 159, and when rod 181 is moved sufficiently in the opposite direction, bias of spring 183 alone is transmitted as "push" to lever 159. A predetermined preload bias remains in both springs when collars 177 and 179 are stopped as described. Also, each spring may have a different bias value.

Affixed to frame 1, as by bolts 186, is a laterally extended substantially rigid arm 187. Affixed, as by welding, to the outer end portion thereof are substantially vertical plates 188 and 189. Pivotally affixed to the latter, as at 190 and 191, are operating levers 192 and 193 which latter in turn are pivotally connected, as at 194 and 195, to the rods 172 and 181 respectively. Pivotally and adjustably affixed to plate 189 is a latch 196 which is adapted to engage a pin 197 affixed to lever 193.

Carried by lugs 198 of plate 188 are four adjustable stop screws 199 and 200 which are adapted to cooperate with stop lugs 201 and 202 which are affixed, as by welding, to the rods 172 and 181. Relative to rod 181, adjustable stops for limiting movement in either direction are required to obtain and maintain a predetermined minimum and maximum bias of springs 182 and 183 when the clutches are engaged. The same requirement applies to rod 172 when it is moved in clutch engaging direction, though on this rod the stop in the opposite direction is merely to preclude excessive travel of lever 158. As the clutch discs become worn the difference in actuating movement may thus be compensated for by adjustment of the stop screws.

Pivotally affixed, as at 241, to an extension of plate 189 is a fluid pressure actuating cylinder 242, the piston shaft 242a of which is suitably affixed to the end of rod 172. Connected to each end of the cylinder, as by conduits 243 and 243a, is a conventional three-way fluid pressure control valve 244 which is provided with a control lever 245 and an exhaust port 245a. A fluid supply conduit 246 may be connected with any suitable source of fluid pressure (not shown), or the cylinder may be actuated by connection with a source of subatmospheric pressure, such as the intake manifold of an internal combustion engine.

Referring now to the rider carrying cars or vehicles, my invention herein relates solely to the devices, elements and mechanisms provided to safely secure the riders in the car and is not concerned with the frame, body, seats or form of the vehicle. With reference to Figure 7, the car may comprise a frame, generally designated 203, seats 204, and flooring 205. Integral with or otherwise affixed to the frame may be a keel beam 206 or other corresponding supporting element.

As will be observed, the car in this disclosure is provided with two seats, and associated with each seat is a mechanical unit for securing the rider, which unit is now to be described. As both mechanical units are identical in all respects the mechanism will be described with reference to one unit only.

Suitably affixed to beam 206, as by welding, is a substantially vertical plate or bracket 207. Pivotally affixed to the plate, as at 208 and 209, is a latch quadrant 210 and a latch or pawl 211 which latter is cooperatively adapted to engage any one of a plurality of teeth 212 in a portion of the latch quadrant. Suitably affixed, as by welding, to a hub of the latch quadrant is a radially extended arm 213 which has affixed to its terminus, as by welding, a lateral cross-bar 214.

Spanning from one rider securing unit to the other and slidably affixed to plate 207 of both units, as by means of overlapping tabs 215 and 215a and supporting pins 216 and 216a, is a trip rod 217. This rod is of substantially rectangular cross section and on its narrow edge is provided with lug extensions 218 and 219 which are adapted to limit its movement in either direction by abutment with cooperating pin 216. Pivotally affixed, as at 219, to a vertical projection 220 of the trip rod 217 is a latch tripper 221 which is adapted to cooperate with a finger extension 222 of latch 211. Radially extended from the hub of the latch tripper is a finger 223 which is adapted to cooperate with an axially extended lug 224 of quadrant 210. A tension spring 225 suitably affixed at one end to rod 217 and at the opposite end to another radially extended finger of tripper 221 urges the latter to rotate clockwise, as viewed in the drawing, until normally it is stopped by abutment of the finger 223 with a stop pin 226 which latter is affixed to the vertical projection 220 of rod 217. A tension spring 227 suitably affixed at one end to plate 207, as by means of a pin extension, and at the opposite end to another radially extended finger of latch 211 urges the latter to rotate counterclockwise, as viewed in the drawing, to engage the teeth 212 of the quadrant 210. A tension spring 228 suitably affixed at one end to plate 207, as by means of a pin extension, and at the opposite end to a portion of quadrant 210 urges the latter to rotate clockwise, as viewed in the drawing, until normally it is stopped by abutment of the quadrant with a further extension of pin 216.

Pivotally affixed, as at 229 (Figure 12), to the frame of the car is the arm 155 and associated elements previously referred to. Radially extending from the arm is a lever 230 the end of which is adapted to abut a lug 231 extending from and affixed to one side of rod 217. Also extending from and affixed to rod 217 is an arm 232. A tension spring 233 affixed at one end to arm 232 and at the opposite end to lever 230 urges the latter to abut lug 231. Another tension 234 affixed at one end to a member of the car frame and at the opposite end to lever 230 urges the latter to rotate clockwise, as viewed in Figure 12.

When roller 154 abuts the crowd-rail 152 under the weight bias of the car, arm 155 is rotated counterclockwise, as viewed in Figure 12, overcoming the bias of springs 233 and 234 until the arm is rigidly stopped, as shown in the drawing, by abutment of the arm with a lug 235 which is affixed to a member of the car frame.

Affixed, as by welding, to beam 206 is a bracket 236 to which is pivotally affixed, as at 237, a manual operating lever 238 one end of which terminates in a radial form 239. The latter terminus is disposed between and cooperates with a pair of lug extensions 240 of rod 217.

The operation of the car mechanism and the ride in the embodiment thus far described is as follows:

When the cars are at rest the roller arm 155 and its associated elements, as previously described, are in the condition shown in Figure 12. Therewith, lever 230 has been moved far enough that its end stands away from lug 231, as shown, and the bias of spring 233 has moved rod 217 to where its stop lug 218 is abutting pin 216, as shown.

Now, when a rider or riders occupy one of the seats the bar 214 associated with that seat is swung far enough toward the rider to safely secure him in the car. Such position of the bar is maintained by the engagement of latch 211 with one of the quadrant teeth 212, the tooth engaged being determined by the girth of the rider. Thus, for example, the bar 214 may assume the position shown at the left in Figure 9.

It should here be observed that each bar is independently movable for securement. Hence, when one bar is moved to a rider securing position the other may remain released, and when the latter is moved to a rider securing position its action has no effect on the former.

When the ride is set into motion, and the cars and hence rollers 154 leave the crowd-rail, the end of lever 230 will abut lug 231 thereby neutralizing the bias of spring 233. Then, under the sustained bias of spring 234 lever 230 will move rod 217 to the left, as viewed in Figure 9, until the stop lug 219 abuts pin 216. In this movement, the bias ratio of spring 234 being superior to that of both of the springs 225, the latch tripper 221 will upon contact with end 222 of the latch be rotated thereby so as to pass across the latter and assume the position shown in Figure 10, where it will remain until roller 154 again abuts the crowd-rail. When this latter occurs lever 230 and rod 217 will of course again be moved to the position shown in Figure 9 wherewith latch tripper 221, being restrained from further clockwise rotation by stop 226, will move latch 211 out of engagement with the quadrant teeth, or to the position shown in Figure 11. However, this effect of the latch tripper is only momentarily sustained, for upon release of the latch the bias of spring 228, which is superior in ratio to that of springs 225 and 227 combined, will immediately rotate the quadrant 210 clockwise causing lug 224 thereof to engage finger 223 and thereby rotate the latter counterclockwise to the position shown at the right in Figure 7 wherein latch end 222 is again free of the tripper. The relation between the latch end and the tripper is such, however, that the former is not freed from the latter until the quadrant 210 has rotated far enough so that its toothed portion has passed beyond the latch point, as shown. Thus, the rider securing bars are returned to the released condition shown at the right in Figure 9.

Should the rider, before leaving the car upon conclusion of the ride, accidently pull the securing bar back to the rider securing position a ride attendant may then again actuate release by means of manual lever 238. Normally this lever moves freely in either direction responsive to reciprocations of bar 217, but should manual actuation be required at any time bar 217 may be moved in either direction by lever 238 simply by applying sufficient force to overcome the bias of spring 233 or 234. This is the sole purpose for provision of spring 233, for were the lever 230 unyieldably connected to bar 217 the latter could not be manually actuated while roller 154 remained in car-weighted abutment with the crowd rail. On the other hand, should roller 154 because of damage or for other reason fail to abut the crowd-rail when the ride is brought to rest bar 217 may readily be manually reciprocated over the bias of spring 234.

It should here be noted that with the mechanism and system just described the one lever 230 and bar 217 is well adapted to operate several more rider securing units in a car with more seats.

The mechanism is also well adapted for use in cars which operate on a track or in other fashion. For example, the bar 217 may be extended, as shown in broken lines at 217a in Figure 9, to cooperate, as by means of a side lug 218a, with a vertical lever 230a affixed to an arm 155a which carries a roller 154a which latter may be adapted to cooperate with any suitable riser such as 152a. This assembly, together with springs 233a and 234a, is, as will be seen, but a dimensionally modified form of the similar assembly of Figure 12.

Describing now the operation of the ride:

In the drawing, the brake, which comprises friction disc 71 and its associated elements, is shown as engaged, which engagement is effected when the operating lever 193 is manually biased to the position shown on the drawing Fig. 4. In this condition the bias of spring 182 is being transmitted to brake pressure plate 67 through pins 71, plate 66, actuating bearing 79, lever 159, and rod 167.

When ready to start ride, the operator will pull lever 193 to the opposite direction as far as rod stop 202 will permit. At this point latch 196 will engage lug 197 and thereby maintain the aforesaid position of the lever without further holding by the operator. With this operation the brake has been released, and the bias of spring 183 is now being transmitted to clutch pressure plate 66 to engage disc 70, which latter being affixed as previously described to sleeve 27 of pulley 26 is rotating therewith. Thus, through its connected elements, rotation is now imparted to clutch carrier 64 and thereby to the ride rotor through shaft 33, gears 38 and 39, shaft 40, spring 47, sprocket 50, chain 52, and sprocket 55.

When the rotor has accelerated to a predetermined number of revolutions per minute, the sweeps 5, under centrifugal force, may assume an angular position of equilibrium such as designated "Y" (Figure 1). When such predetermined R. P. M. is approximately established the operator will actuate clutch operating lever 192, moving it as far in the opposite direction as rod stop 201 will permit. Thus, in the same manner as described for the rotor drive clutch, bias of spring 173 is transmitted to clutch pressure plate 80 to engage disc 82 of the swing drive clutch. Thereby, through its connected elements, the rotation of the pulley 26 is now imparted to the sleeve 30 and hence the sprocket 95, which latter, through the driven elements previously described, imparts rotation to the shaft 103 of the swing drive. Therewith, rotation of shaft 103 is converted to pull on swing pull chain 117, which latter, as apparent, transmits such pull to the plunger 126a and hence to rocker arms 133. Thus, the sweeps 5 are induced to swing up and down in unison in a vertical plane while being whirled by the rotor through a horizontal plane.

It is of course obvious that each time the sweeps reach or approach the end of an induced upward swing the driving clutch must be released so as not to oppose reciprocal downward swing. Therefore, the operator is required to manipulate lever 192 back and forth and thereby alternately engage and release the swing drive clutch in timed relation with the oscillatory periods of the sweeps. Under this actuation the sweeps may be induced to swing to and within limits of some predetermined maximum degree of arc, such as designated "X" and "Z" (Figure 1).

Where it is desired, at some extra structural cost, that the operator be enabled to actuate the swing drive clutch with minimum manual effort, the fluid pressure actuating cylinder 242 may be provided. With this, when the valve lever 245 is in the "neutral" position, in which it is shown in Fig. 4, the exhaust port 245a is open to both of the conduits 243 and 243a, and the cylinder piston may then be freely reciprocated by the direct operating lever 192. But with manipulation of the valve lever to either side of neutral, fluid pressure is alternately admitted to and exhausted from cylinder chamber through conduits 243 and 243a, thereby effecting engagement or release of the clutch.

By skillful manipulation of the swing drive clutch, such as by occasionally omitting a power application to an oscillation, the operator could keep the swing of the sweeps from exceeding the limits of a predetermined maximum degree of arc, but it is part of my invention to eliminate the necessity for such skilled control by the operator. Under the physical laws of the pendulum it is known that the number of swings or oscillations per minute of a given pendulum are constant irrespective of the degree of arc through which it is oscillated. Thus, the length of of the arc at any given radius for any predetermined degree of swing multiplied by the number of oscillations per minute will determine the velocity in feet or inches per minute at which a driving element, cooperating with the pendulum at such given radius, will have to move to produce and sustain, but not exceed, the degree of swing so predetermined. Hence, in my apparatus the straight line velocity of the chain 117 is so regulated by the ratio of the driving elements that its maximum is exactly that required to swing the sweeps to the limits of a predetermined degree of arc, but not further.

The purpose of the overrunning clutch 102 in the swing drive elements should now be explained. It is apparent that once the sweeps are set into oscillation they will so continue for some time under their own inertia. Therefore, upon cessation of rotation by power of the swing drive elements, continuing oscillation of the sweeps and hence reciprocation of the counterweight 118 and chain 117 would either require the counterweight 118 to be heavy enough to forwardly rotate all the driving elements leading back to the swing drive clutch or that the shaft 103 itself be sufficiently free of restraint as to rotate under the influence of a reasonably light counterweight. This latter is accomplished by and is one of the reasons for provision of the overrunning clutch herein. Were the shaft 103 or the swing drive elements in general not rotatable under influence of the counterweight, the chain 117 would become disengaged from idler sprocket 120 with damaging results. Without the overrunning clutch on shaft 103 such a condition could easily occur, as, for example, by maintaining engagement of the swing drive clutch while the clutch assembly rotation was unexpectedly retarded or stopped, or by some accidental jamming of the swing drive primary elements. This is another and more important reason for provision of the overrunning clutch in this drive assembly.

Referring now to the rocker arms 133, it will be noted that by provision of the well 23 in rotor head 4 the rocker link pivots 247 are adapted to swing substantially equidistant each way from their own horizontal swing arc center. This is illustrated by the pivot position at 247a, shown in broken lines in Fig. 3, which when compared with a horizontal line through the axle center will be seen to equal approximately one-half the swing angle of "X" to "Z." This equalized throw is required to secure minimum variation in pull force and velocity of travel at the point of actuating connection.

With the ride in motion and the sweeps swinging in a vertical plane as described, it may now be readily seen that if by any happenstance rotor rotation was suddenly stopped or too rapidly decelerated, the cars, freed of centrifugal force, could drop and crash into the frame of the ride, with probable injury to riders. Therefore, provisions are made at two vital points to safeguard against this. One is the overrunning clutch 76 which cooperates with the clutch friction disc 70. With this, should the driving power fail at the source, thereby tending to stop rotation of the driving pulley 26, the ride rotor and other driven elements on the driven side of the overrunning clutch are adapted to coast freely without the retardation which would result were they required to back drive a dead power unit, such as an engine. The other safeguard relates to the rotor upper bearing 56. Should this by any cause become seized to the rotor obvious damaging effects would normally result, but with provision for shearing of the bolts 57 under a predetermined overload, as previously described, danger is eliminated.

Describing now the stopping of the ride, the operator first reverses his actuation of the swing drive clutch, engaging it as the sweeps swing downward and releasing it as they swing upward. Thus, the swing drive clutch now functions as a brake to rapidly stop the vertical plane oscillation of the sweeps. Then, when the osillation has been sufficiently reduced, the operator will release the latch 196 and apply the rotor brake by moving lever 193 back to the position shown in the drawing Fig. 4, where he will hold it until the ride comes to rest.

It should now be noted that since the brake disc 71 is affixed to sleeve 30 which carries sprocket 95, the braking force will react against the swing drive elements. Thus, the rotor deceleration inertia is applied to further inhibit sweep oscillation and at the same time urge the sweeps outwardly so that the car rollers 154 will be conduced to about the crowd-rail gently. When the cars come to rest, one operation of the ride is complete.

It is now apparent that the swing drive clutch not only functions as both a clutch and a swing oscillation brake, but it is also subject to more rapidly repeated and continuous actuation than an average clutch. Therefore, it is required that special provision be made for rapid dissipation of its generated heat. For this purpose the radiating surfaces of plates 80 and 81 are increased by fins 90.

It is also apparent that if the rotor brake should be applied too powerfully, thereby decelerating the rotor too quickly, the sweeps and cars could still be caused to drop too rapidly and crash the crowd-rail in spite of the brake reaction urging them outwardly. This because the practical ratio of braking force to the loaded weight of the cars is by no means sufficient to actually suspend them away from the crowd-rail without the aid of centrifugal force. Therefore, the decelerating capacity of the rotor brake is pre-established and controlled by the pre-set bias of actuating spring 182. Otherwise, were the capacity of the brake not so limited, safe stopping of the ride would depend upon the skill and competence of the operator, and this is not desirable.

The foregoing requirement also applies to the rotor and swing drive clutches to preclude possibility of overstressing the drive elements. Thus, the accelerating capacity of these clutches is also pre-established and controlled by the preset bias of actuating springs 173 and 183.

Under natural physical laws, the sweeps, when set into vertical plane oscillation, induce a corresponding rotational oscillation in the ride rotor. In other words, with each oscillation of the sweeps, the rotor rotation accelerates and decelerates. It is obvious that this rotor oscillation could not practically be carried back through the drive elements to the power source, and it is also notable that any undue restraint to oscillation of the rotor would tend to oppose and dampen the oscillation of the sweeps. Therefore, the rotor rotational oscillation compensating spring 47 is provided, and interposed at a point in the drive where it revolves at a relatively low ratio to the rotor speed. When driving the rotor under normal torsion, before sweep oscillation is started, the spring 47 is torsionally biased by the otherwise free sprocket 50 to the extent of the sustained torsional force. When oscillation is induced, the spring first helps the sprocket 50 to accelerate, then yields to its required driving torque bias under deceleration.

With amusement rides, it is often desirable that the ride be well adapted for efficient and frequent transfer from one operational site to another. For such purpose, to facilitate handling and transporting, it is also desirable that the ride first be to some extent dismantled and that such dismantling and re-erection be achievable easily and rapidly. Thus, my invention includes the following improved arrangements for this purpose:

By detaching rods 166 and 167 from their pivot connections 164 and 165, and removing of bolts 186 of arm 187, the latter and associated elements may be removed from the ride structure.

Cars 6 are detachable from the sweeps 5, and the latter from the holders 134, by withdrawal of the pins 147.

The footsills 2 may be detached by withdrawal of pins 2a.

Upon removal of the bolts 9, the crown 8 of the frame 1 is adapted to be lowered within the main structure 7.

As previously described, the lower member 10 of the rotor column is coupled to the upper member 13 by means of the coupling plate 15, which underlaps the upper member and overlaps the lower member. Thus, by first removing the bolts 17, then lifting the rotor upper member and associated elements by suitable hoisting means, the bolts 18 become accessible, and when these are removed the coupling plate is free to be withdrawn, the slot 16 thereof allowing passage of the chain 117. The rotor upper member 13 is now free to be lowered by suitable hoisting means and telescoped into the rotor member 10 while at the same time the frame crown 8 is lowered as far as the structure will permit. In this condition the machine may now be tipped over onto a suitable truck or trailer and transported.

It is now to be observed that with the rotor coupling arrangement just described the internal diameter of the rotor member 10 need be but slightly greater than the external diameter of member 13, and the latter may be guided and supported within the former by the outer periphery of the flange member 14. It is also to be noted that the bolts 17 and 18 are not required to support in tension the mass weight of the rotor upper member and its associated elements.

Figure 17:
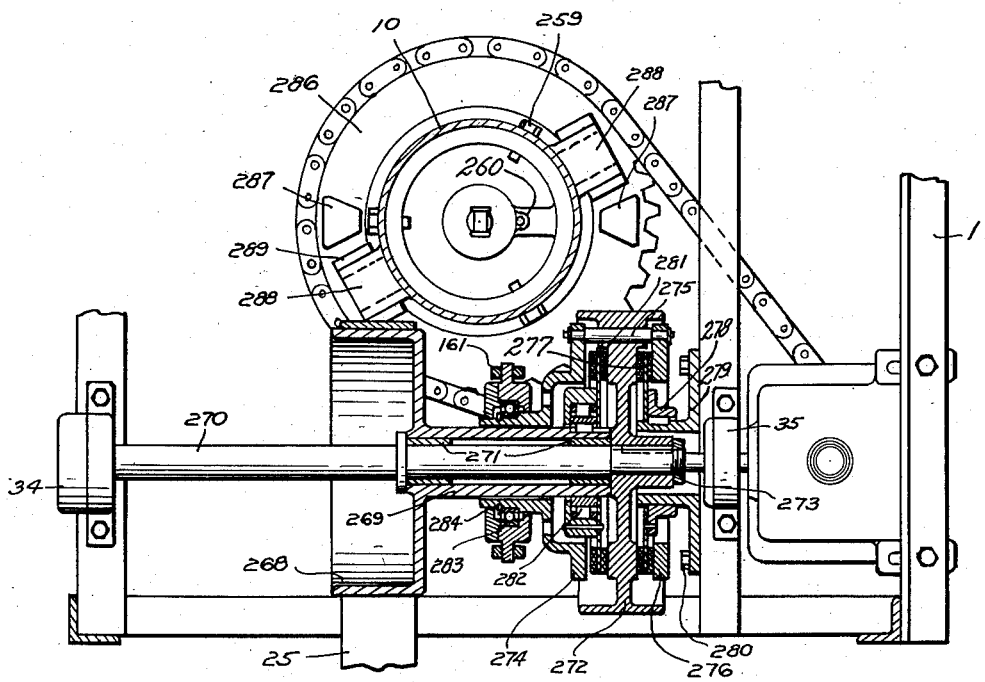
Figure 17 is a horizontal section through a modified form of driving, operating and clutching elements for the rotor and oscillating elements illustrated in Figure 14 and, Figure 18 is a fragmentary vertical section illustrating a modified form of sweep coupling.

Figures 14 and 17 show a modified or alternative form of swing drive and rotor drive rotational oscillation compensating means. In this embodiment the swing drive is operated directly by fluid pressure and the rotor rotational oscillation is provided for by means of a "lost motion" type of rotor drive.

With reference to Figure 14, the fluid pressure swing drive may comprise a suitable source of fluid pressure (not shown); a pressure accumulator tank 248, illustrated diagrammatically; a conventional two-way fluid pressure control valve 249 provided with an exhaust orifice 250 and a lever 251; a suitable rotary fluid connection, generally designated 252; connecting fluid conduits 253; a fluid cylinder 254; a cylinder head 255; a piston head 256, and piston shaft 257, which latter may be connected, as shown, to the swing pull chain 117 of the first described embodiment.

The cylinder 254 may be provided with a radially extended flange portion 258 by which it is adapted to be affixed to rotor member 10 as by means of bolts 259. Disposed in a thickened longitudinal protuberance 260 along one side of the cylinder wall is a fluid passage 261. This, at its upper end, is provided with a port 262, which opens into the cylinder chamber, and at its lower end communicates with a radially disposed passage 263. The latter in turn communicates with conduit 253 by means of an axial passage 264. The ends of passages 261 and 263 are closed as with plugs 265 and 266. A vent aperture 267 is provided in the cylinder wall near its bottom.

In this embodiment, as is apparent, the swing drive clutch and its associated driven elements are replaced by the fluid drive. Hence, there remains here only the rotor drive clutch and brake and their associated driving and driven elements.

With reference to Figure 17, the rotor clutch and brake here shown comprises a main pulley 268, which is provided with an axially extended annular sleeve 269 which is rotatably journaled on a shaft 270 as by bushings 271; a clutch body 272 carried by and keyed to shaft 270 and retained axially against a shoulder of the latter by means of a nut 273; a clutch pressure plate 274 which is carried by, affixed to, and driven by pins 275, which latter are in turn carried by and axially slidable in clutch body 272; a brake pressure plate 276 which is carried by, affixed to, and driven by the opposite end of pins 275; a brake friction disc 277 affixed to a hub 278 which is carried by and keyed to the hub of a plate 279 which latter is affixed, as by bolts 280, to a member of the frame 1; a clutch friction disc 281 affixed to an overrunning clutch unit, generally designated 282, which latter is carried by and keyed to the sleeve 269; a suitably housed clutch actuating ball bearing 283 journaled on an axially extended annular hub of the plate 274 and axially retained thereon as by means of a snap-ring 284.

As in the previously described embodiment, the shaft 270 is journaled and retained axially in housed bearings 34 and 35 which are affixed to members of the frame 1.

Referring now to the modified rotor drive rotational oscillation compensating means, this may comprise a sprocket 285 carried by and keyed to the shaft 40 of the previously described structure; a sprocket 286 carried by the base member 11 of the rotor and suitably journaled thereon for limited rotation and drivable by the sprocket 285 as by means of chain 52; axially extended driving lugs 287 integral with or suitably affixed to the sprocket 286; radially extended cooperating drive lugs 288 suitably affixed, as by welding, to rotor member 10, which lugs may be provided with suitable resilient shock absorbing facings, as 289.

Describing now the operation of the ride with these modified elements, it will be seen that the operation of the rotor clutch and brake corresponds in all but one respect with that of the first described embodiment. Herein the rotor brake disc is stationarily affixed to the ride frame, and when the brake is engaged, the clutch body 272 and hence the rotor is decelerated and stopped by the stationary disc. Clutch and brake actuating fork 161, lever 159 and all of its associated elements remain and operate the same as in the previously described embodiment, but actuating lever 158 and all of its associated elements are deleted, their counterpart herein being valve 249 and lever 251.

When the rotor drive clutch is engaged, the lugs 287 of sprocket 286 will abut the lugs 288 of the rotor for driving. When the rotor has accelerated to a predetermined number of revolutions per minute, as hereinbefore specified, the operator may then induce the sweeps 5 into vertical plane oscillation by back and forth manipulation of the valve lever 251. In one position the latter admits fluid pressure to the chamber of the cylinder 254 and in the opposite position permits the cylinder to vent or exhaust through the valve exhaust port 250. The manner in which fluid pressure actuates the cylinder piston is obvious and apparent in the drawings. A suitable fluid volume control (not shown) obviously will be provided for the fluid sweep oscillator.

To stop the sweep oscillation by means of the fluid pressure, again it is only required that the operator reverse his actuation of the lever 251, applying the pressure on the downward instead of upward swing of the sweeps. Thus, also, as with the mechanical brake of the previously described embodiment, application of pressure may be sustained to urge the sweeps outwardly during the rotor deceleration to conduce gentle abutment of the car rollers with the crowd rail.

With the rotor rotational oscillation compensating means hereof, with each oscillation of the rotor, the lugs 288 simply advance away from the sprocket lugs 287 upon oscillatory acceleration and return to abutment therewith upon oscillatory deceleration.

When the rotor brake is applied, the sprocket lugs 287 retard to abutment with the opposite side of the lugs 288, and braking is thereby effected in obvious manner.

It is, of course, apparent that the rotor rotational oscillation compensating means hereof may be utilized as well in combination with the mechanical swing drive of the first described embodiment. Similarly, the fluid pressure swing drive may be utilized in combination with the spring driven rotor rotational oscillation compensator of the first described embodiment.

Figures 15 and 16 show another modified adaption of the rotor rotational oscillation compensating means of Figures 14 and 17. The operation of this is similar in all respects to that described for the latter figures, but the compensator is carried by the drive shaft 40 instead of by the rotor member 11. This embodiment comprises a collar 290, carried by and keyed to the shaft 40, which collar is provided with radially extended driving lugs 291, and which latter may be provided with suitably resilient shock absorbing facings, as 292; a sprocket 293, which is the counterpart of sprocket 285 of Figure 14, and which is carried by the shaft 40 and suitably journaled thereon for limited rotation; a radially extended flange 294 formed at the end of an axially extended hub 295 of the sprocket; axially extended cooperating drive lugs 296 integral with or suitably affixed to flange 294.

Figure 18:
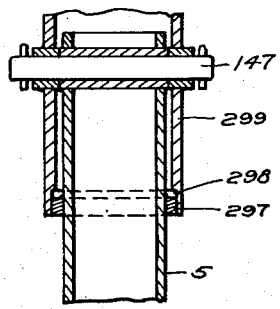

Figure 18 shows a modified form of coupling for the sweeps 5, which may be utilized at either car or axle end of the sweeps. In this modification, an annular supporting collar or external diametral extension 297 of sweep 5 is substituted for one of the pins 147. The collar is suitably affixed, as by welding, to the sweep, its external annulus being adapted to enter and fit closely a counterbore 298 of the sweep holder 299.

Having described my invention, what I claim is:

1. In an amusement ride, a stationary supporting frame, a substantially vertical rotor mounted and journaled for rotation in said frame and provided at its upper portion with a plurality of swingable sweep supporting elements, a plurality of substantially rigidly constructed sweeps swingably supported at one end by said sweep supporting elements and normally depending downwardly therefrom, a rider vehicle affixed to the free end of each of said sweeps, the substantially rigid construction of the latter being continuous from the sweep supporting element to said rider vehicle, a prime mover, motion transmitting mechanism for revolving the rotor at a predetermined speed by the prime mover and for urging the sweeps outwardly from the rotor under centrifugal force, motion transmitting mechanism including reciprocating driving means connected to the sweeps whereby the latter may be oscillated in unison in a vertical plane while being whirled by the rotor in a horizontal plane, and drive controlling means for the reciprocating driving means for oscillating the sweeps at their natural rhythmic frequency.

2. In an amusement ride, a stationary supporting frame, a substantially vertical rotor mounted and journaled for rotation in said frame and provided at its upper portion with a plurality of swingable sweep supporting elements, a plurality of substantially rigidly constructed sweeps swingably supported at one end by said sweep supporting elements and normally depending downwardly therefrom a rider vehicle affixed to the free end of each of said sweeps, the substantially rigid construction of the latter being continuous from the sweep supporting element to the rider vehicle, a prime mover, motion transmitting mechanism for revolving the rotor at a predetermined speed by the prime mover and for urging the sweeps outwardly from the rotor under centrifugal force, motion transmitting mechanism including straight-line reciprocal driving means connected to the sweeps whereby the latter may be oscillated in a vertical plane while being whirled by the rotor in a horizontal plane, and drive controlling means for the reciprocating driving means for oscillating the sweeps at their natural rhythmic frequency.

3. Apparatus as described in claim 2 including in the motion transmitting mechanism for inducing oscillation of the sweeps an engageable and disengageable motion transitting element which moves at a predetermined fixed speed relative to a predetermined drive ratio between said element and said straight-line reciprocal driving means whereby a prescribed maximum arcuate degree of sweep oscillation may be effected but not exceeded, an extended oscillatory driving arm affixed to each sweep assembly, a drive link pivot on the driving arm connected to said straight-line reciprocal driving means, the fixed angular relationship between the axis of said pivot and the linear axis of the sweep being such that when the sweeps are oscillated to the prescribed maximum arcuate degree the drive link pivot axis of the driving arm is caused to oscillate a substantially equal arcuate degree to each side of a plane forming a right angle to the reciprocal line of the straight-line reciprocal driving means.

4. Apparatus as described in claim 2 including manually actuatable braking means adapted to retard and stop the rotor rotation and the sweep oscillation co-operatively, said braking means comprising an acting and a reacting member, means whereby one of said members is connected to the rotor driving elements and means whereby the other of said members is connected to the sweep oscillatory driving elements.

5. In an amusement ride, a supporting frame, a rotor column journally mounted in the frame and provided with rider carrying means, the rotor comprising a plurality of sections one detachable from the other and at least one section thereof formed hollow and adapted to telescope over another section thereof when detached, coupling means for joining the rotor sections comprising a detachable and removable coupling plate disposed between the joining ends of the rotor sections, said plate being attachable to and overlapping the coupling end of the hollow rotor section and having a portion subtended toward the rotor axis across the hollow aperture thereof whereby the block said aperture when it is installed, the subtended portion in turn being attachable to the coupling end of the rotor section which is normally adapted to telescope into the hollow section.

6. In an amusement ride, a substantially rigid supporting frame, a rotor mounted and journaled for rotation in said frame, radially supporting journal means for the rotor disposed at the upper portion of said frame, radially and axially supporting journal means for the rotor disposed at the lower portion of said frame, a ball and socket unit disposed at the lower end of the rotor and interposed between said rotor and the journal means supporting it at the lower portion of said frame.

7. Apparatus as described in claim 2 including in the motion transmitting mechanism for inducing oscillation of the sweeps a reciprocal flexible driving element adapted to transmit force in one direction and free-running and subject to slack in the opposite direction, driving mechanism connected to the flexible driving element to reciprocate the latter, and an overrunning clutch incorporated in said driving mechanism to prevent slackening of said flexible driving element when it is moving in its free-running direction.

8. Apparatus as described in claim 2 wherein the motion transmitting mechanism for inducing oscillation of the sweeps includes a reciprocal flexible driving element, an upper end portion of which is connected to an element of the sweeps and another portion of which is engaged with a driving member of said transmitting mechanism, a lower end portion of said flexible driving element depending from said driving member and having affixed thereto a gravity influenced counterweight to maintain engagement of the driving member with the flexible driving element.

9. Apparatus as described in claim 2 including manually actuatable braking means to retard and stop the rotor rotation, said braking means being associated with the motion transmitting mechanism and therethrough connected in series with both the rotor drive and the sweep oscillation drive, and means whereby the rotor braking force reacts against the sweeps tending to urge them outwardly from the rotor.

10. Apparatus as described in claim 2 including in the motion transmitting mechanism for driving the rotor an element provided with lost motion connections whereby to freely react to rotary oscillation induced in the rotor responsive to the sweep vertical oscillation without transferring such oscillation to the prime mover.

11. Apparatus as described in claim 2 wherein the rotor is formed hollow and wherein the motion transmitting mechanism includes a substantially rigid reciprocating element connected to and operable to oscillate the sweeps, a plurality of bearings slidably supporting the reciprocating element, the bearings disposed in a holder and the holder supportedly disposed within and detachably affixed to the hollow rotor at its upper portion.

12. Apparatus as described in claim 2 wherein the motion transmitting mechanism includes an actuatable clutch for transmitting motion to oscillate the sweeps, and manually controllable fluid pressure means for actuating the clutch including a fluid operable element, a source of fluid pressure, and fluid control means.

13. In an amusement ride, a stationary supporting structure, a rotor mounted and journaled for rotation in said structure, rider vehicles carried by said rotor, a substantially constant speed and force prime mover, and motion transmitting mechanism whereby said prime mover is adapted to drive said rotor, a manually operable pressure actuatable friction clutch included in said motion transmitting mechanism whereby the drive from said prime mover to said rotor may be connected or disconnected, a manually operable clutch actuating element connected through linkage to a pressure actuatable clutch engaging element of said clutch, means for limiting the rate at which the rotor may be accelerated from rest to maximum speed of rotation, said means comprising a spring under a predetermined preload tension disposed in series in said linkage, and means whereby the pressure applicable to clutch engagement is transmitted through and determined by the pre-set tension of said spring.

14. In an amusement ride, a stationary supporting structure, a rotor mounted and journaled for rotation in said structure, rider vehicles carried by said rotor, a substantially constant speed and force prime mover, and motion transmitting mechanism whereby said prime mover is adapted to drive said rotor, a manually controllable pressure actuated friction clutch included in said motion transmitting mechanism whereby the drive from said prime mover to said rotor may be connected or disconnected, manually controllable clutch actuating mechanism connected to a pressure actuatable engaging element of said clutch, and resilient pre-set pressure controlling means incorporated in said clutch actuating mechanism whereby the pressure applicable to clutch engagement is limited to a prescribed maximum, thereby permitting the clutch to temporarily slip under load after full engagement and accordingly to limit the rate at which said rotor may be accelerated from rest to its full speed rotation.

15. Apparatus as defined in claim 2 wherein the prime mover is mechanically powered, and wherein the motion transmitting mechanism comprises an overrunning clutch in the line of drive from said prime mover to the rotor whereby the latter is free to coast if said prime mover be rendered inactive while said rotor is in motion.

16. Apparatus as defined in claim 2 wherein the motion transmitting mechanism for inducing and sustaining oscillation of the sweeps includes a cylinder provided with a fluid pressure operable piston, a source of fluid pressure, fluid conduits, and fluid pressure control means.

17. Apparatus as described in claim 2 including in the motion transmitting mechanism for driving the rotor a resilient driving element having sufficient yieldability to react to rotary oscillation induced in the rotor responsive to the sweep vertical oscillation without transferring such oscillation to the prime mover.

18. Apparatus as described in claim 2 wherein the rider vehicles comprise a plurality of elements for securing riders therein including elements cooperative with the persons of the riders which elements are movable to positions wherewith the riders are secured in the vehicle, means whereby the elements are automatically locked in such positions upon movement thereto, means whereby each of the several securing elements is independently securable, and means whereby the securing elements are automatically released upon conclusion of the ride.

19. Apparatus as described in claim 2 wherein the rider vehicles comprise elements for securing riders therein including elements cooperative with the persons of the riders which elements are movable to positions wherewith the riders are secured in the vehicle, means whereby the elements are automatically locked in such positions upon movement thereto, means whereby the securing elements are automatically and independently adjustable to the girth of the riders, and means whereby the securing elements are automatically released upon conclusion of the ride.

20. Apparatus as described in claim 2 wherein the rider vehicles comprise a plurality of elements for securing the riders therein including elements cooperative with the persons of the riders which elements are movable to positions wherewith the riders are secured in the vehicle, means whereby the elements are automatically locked in such positions upon movement thereto, means whereby each of the several securing elements is independently securable, and means whereby upon conclusion of the ride the several securing elements are automatically released universally by a common actuator.

21. Apparatus as described in claim 2 wherein the rider vehicles comprise elements for securing riders therein including elements cooperative with the persons of the riders which elements are movable to positions wherewith the riders are secured in the vehicle, means whereby the elements are automatically locked in such positions upon movement thereto, means whereby the securing elements are automatically released upon conclusion of the ride, and manually operable means remote from the rider whereby the securing elements may be released under any conditions.

22. In an amusement ride, a stationary supporting structure, a rotor mounted and journaled for rotation in said structure, rider vehicles carried by said rotor, a prime mover and motion transmitting mechanism whereby said prime mover is adapted to drive said rotor, a manually controllable pressure applicable brake connected to said rotor and adapted to arrest the rotation thereof, brake controlling mechanism including a manually movable brake actuating element connected to and adapted to transmit pressure to a pressure responsive braking member, means incorporated in said controlling mechanism for limiting to a prescribed maximum the pressure which may be transmitted from said actuating element to said braking member, said means comprising an element which yields when a predetermined force is applied to said actuating element and which thereafter permits the latter to be overmoved in its brake applying direction while transmitting to said braking member only the pressure determined by the member which yields.

23. Apparatus as described in claim 2 wherein the rider vehicles comprise means for securing a rider therein including a rider securing element manually movable toward the person of the rider to a position wherewith the rider is substantially confined in the vehicle, means whereby said securing element is automatically locked in said position upon movement thereto, means whereby upon conclusion of the ride the said securing element is automatically released, the last said means comprising a member on the vehicle movable to a condition which effects such automatic release and a cooperative element on the ride structure, separate from the vehicle, which latter element is adapted to move the said member to its release condition, means whereby upon conclusion of the ride the said member and said cooperative element are automatically brought into cooperation to move said member to its release effecting condition, means whereby the said rider securing element may immediately after release be again moved to and locked in rider securing position whether or not the member movable to effect automatic release has returned to its pre-release condition.

References Cited in the file of this patent

UNITED STATES PATENTS

| | | | |
|---|---|---|---|
| 716,755 | Porter | Dec. 23, | 1902 |
| 966,135 | Stein | Aug. 2, | 1910 |
| 982,128 | Davison | Jan. 17, | 1911 |
| 1,012,280 | Robinson | Dec. 19, | 1911 |
| 1,447,110 | Weaser | Feb. 27, | 1923 |
| 1,521,498 | Armstrong | Dec. 30, | 1924 |
| 1,727,490 | Spillman | Sept. 10, | 1929 |
| 2,165,698 | Eyerley | July 11, | 1939 |
| 2,195,805 | Baker | Apr. 2, | 1940 |
| 2,211,876 | Barnard | Aug. 20, | 1940 |
| 2,307,737 | Courtney | Jan. 12, | 1943 |
| 2,364,699 | Eastman | Dec. 12, | 1944 |
| 2,433,807 | Bartlett | Dec. 30, | 1947 |